Patented Sept. 12, 1944

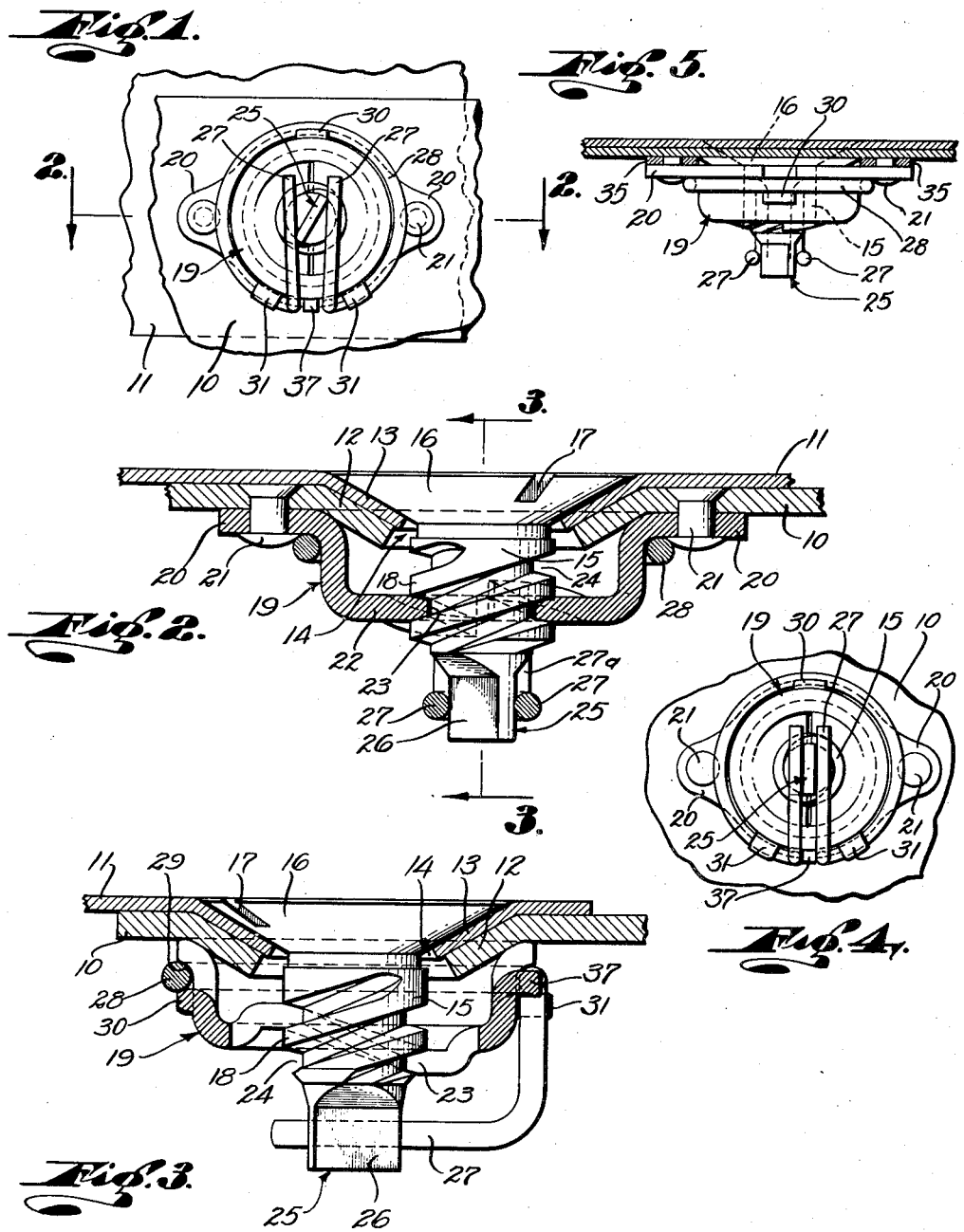

2,358,005

UNITED STATES PATENT OFFICE 2,358,005

SELF-TIGHTENING FASTENER

Emmet M. Green, Los Angeles, Calif.

Application December 24, 1942, Serial No. 469,980

7 Claims. (Cl. 24—221)

This invention has to do generally with fasteners of the type comprising a stem or screw adapted to be inserted through and to connect sectional work, one side of which may be inaccessible, and having at that side of the work a retaining element releasably holding the stem against withdrawal or loosening from the work. More particularly, the invention is concerned with the stated type of fastener in which a threaded stem is turned into a nut element, and with improved means for positively assuring against accidental loosening of the fastener from tightened condition, under all loads and vibrations.

Heretofore it has been proposed to releasably fasten an assembly of work sections by turning into a nut fixed at the inaccessible side of the work, a threaded stem inserted through the work, and to prevent accidental loosening of the stem by resisting longitudinal or axial movement of the stem out of the nut. Such expedients resist turning of the stem out of the nut only indirectly, and to an uncertain degree controlled by axial restraint on the stem. It is believed that positive assurance against accidental loosening of the stem can best be had only by direct resistance to the stem rotation, and by application of a force constantly seeking to turn the stem in a tightening direction.

Accordingly, one of my primary objects is to provide yielding or spring-acting means applying to the stem when in tightened condition, a force not only resisting loosening rotation of the stem, but also constantly tending to turn the stem in a tightening direction as any looseness may develop from vibration, wearing of the parts, or for other causes. The purposes of the invention may be served in a simple, though typical, manner by forming the inner end of the stem, or a portion thereof beyond the nut, with certain shape characteristics for engagement with one or a pair of spring elements, whereby the springs exert against the stem a torque tending to turn the stem into the nut. As illustrative, the inner end of the stem may have the form of a flat sided, relatively thin tongue coaxial with the body of the stem and having a width sufficient for the desired turning moment by the spring forces applied to the corners of the tongue. As will appear, the shape of the tongue is of further importance by reason of the fact that it permits advantage to be taken of the spring thrust throughout a stem turning range approaching 90 degrees.

Another particularly important feature is that of predetermining the position of the nut with relation to the work thickness, to assure that the spring-engaged portion of the stem will assume, when the stem is fully tightened, a position such that the spring elements exert a tightening, rather than loosening, effect on the stem. In the hereinafter described form of the invention, turning of the stem into the nut is alternately resisted and aided by the spring thrust. The relationship between the nut position and work thickness however is so predetermined that at the point at which the stem head is brought into engagement with the work, the spring-engaged portion of the stem will be turned to a position at which the springs will tend to turn the stem further into the nut.

Reference may be had to the accompanying drawing for a more complete understanding of the stated objects and features, as well as the details of a typical embodiment of the invention. In the drawing:

Fig. 1 is a plan view of the fastener;

Fig. 2 is an enlarged cross section taken on line 2—2 of Fig. 1;

Fig. 3 is a section on line 3—3 of Fig. 2;

Fig. 4 is a view similar to Fig. 1 showing the stem end in neutral position; and Fig. 5 is a view, partly in section, illustrating a variational feature of the invention.

As previously indicated, the fastener is applicable to various types and forms of work. Merely as illustrative of a typical embodiment of the invention, the fastener assembly is shown to be used for releasably holding together an assembly of metal sheets 10 and 11 having inner-fitting indentations 12 and 13 about an opening 14 through which the fastener stem is inserted. The fastener comprises a stem 15 having a head 16 countersunk within the work indentation and containing a slot 17 to receive a screw driver for rotation of the stem into and out of engagement with the nut element, as will presently appear. The stem 15 carries a suitable thread designed primarily for adequate bearing engagement with the nut element 19 and for the safe assumption of the maximum load to be transmitted axially of the stem. As illustrative, the stem may carry a double square-type thread 18 extended axially of the stem a distance sufficient for full engagement with the nut element in the tightened position of the fastener as shown.

It is contemplated that the stem may be turned into a nut element of any suitable type and form maintained, at least during threading of the stem into it, in fixed position at the side of the work opposite the head 16. Typically, the nut element 19 is shown to comprise a cup-shaped member having lugs 20 secured to the inner work section 10 as by rivets 21, and having a portion 22 containing an opening 23 to receive the threads 18. As best illustrated in Fig. 3, where the nut element 19 is made relatively thin to adapt it for economical manufacture as a stamping, portion 22 may be shaped with the illustrated angularity about the opening 23 so that the nut metal will correspond in thickness substantially to the spacing at 24 between the threads and will follow the thread angularities to afford maximum bearing engagement between the threads and the nut metal. By virtue of its shape characteristics and proper selection of the metal of which it may be formed, the nut element may be made sufficiently strong to support, without appreciable deformation, heavy loads transmitted to it axially of the stem. At this point it may be observed that the entirety of any force or load tending to separate the work sections 10 and 11 is assumed by the nut element 19, independently of the springs resisting turning of the stem out of the nut.

The inner end of the stem 15 is shaped to form a flattened projection or tongue 25 for engagement with one or a pair of spring elements acting to prevent loosening of the fastener by positively resisting back-out rotation of the stem. The tongue 25 preferably is formed with flat surface sides 26 and may be made relatively thin to permit continued application of the spring force throughout substantially 90 degree stem rotation. The width of the tongue 25 is shown to correspond to the stem diameter at the base of the threads 18, although it will be understood that if desired, the width of the tongue may be increased, say to the maximum diameter of the stem threads. As will appear, the tongue 25 serves essentially as a stem-carried eccentric means by reason of its engageability by the springs to impart rotating forces to the stem at points offset from the axial center of the stem.

As the stem is turned through the nut element 19, the tongue 25 enters between a pair of spring elements 27 normally disposed in spaced relation a distance corresponding to about the thickness of the tongue 25, so that as the tongue is rotated between the spring elements the latter are deflected laterally relative to the stem. If desired, the tongue may be made sufficiently long that it can be inserted between the springs before the stem is turned to engage its threads with the nut. While the spring elements may be formed and mounted in any desired fashion, I prefer to employ a loop form of spring so that its engagement by the tongue 25 will bring into play the resiliency and action of the loop as a whole. Accordingly, the spring elements 27 preferably comprise opposed portions or ends of a spring loop, the annulus 28 of which is mounted on the nut element 19, as by confinement within a recess or curved portion 29 of the nut, in which the spring loop is held by lugs 30 and 31. In their neutral or reflexed positions, the springs 27 may substantially parallel the tongue 25 and be spaced apart a distance corresponding to about the thickness of the tongue, all as shown in Fig. 4. The spring spacing, as well as proper positioning of the springs with relation to the tongue, may be assured by providing a spacer lug 37 on the nut element 19, the lug being engaged by the end portion of the annulus 28. Lugs 31 may be spaced from portions 27a of the spring loop sufficiently to permit free flexure of the spring loop to the extent of its maximum deformation.

In applying the fastener assembly, the stem 15 is inserted through the work opening 14 and the threads 18 turned through the nut opening 23 until the head 16 is fully seated against the work as shown in the drawing. During advancement of the stem, the tongue 25 enters between the springs 27 and, depending upon such considerations as the length of the tongue, may cause alternate deflections of the springs resisting and then aiding turning of the stem until the latter is fully inserted. It may be assumed that after entering between the springs, the tongue first will have 180 degrees rotation, during the first 90 degrees of which the tongue spreads the springs, while during the successive 90 degrees the springs converge against the tongue. Upon continued rotation of the tongue through the next 90 degrees, the springs are spread and a maximum distance of spread is reached when, in Fig. 1, the tongue parallels the section line 2—2. The position of the nut element 19 is predetermined with reference to the work thickness, or the point in the stem advancement at which the head 16 engages the work, so that the head seats against the work within the next 90 degrees turning of the stem. Thus Figs. 1 and 2 show the tongue 25 to be turned in the neighborhood of 45 degrees beyond the "dead center" position, when the head 16 is fully engaged against the work. In this position of the tongue, springs 27 bear against it at diagonally opposed corners and thereby exert a direct rotative force resisting reverse rotation tending to withdraw or loosen the stem from the nut. Moreover, by reason of capacity given the stem or tongue for continued turning in a tightening direction under the sustained torque exerted by the springs, vibrations otherwise tending to create looseness result in progressively tighter engagement of the threads with the nut.

From the foregoing it will be understood how the position of the tongue relative to the springs when the head 16 becomes fully seated, is predetermined in accordance with the spacing of the nut element and the work surface engaged by the screw head. Thus in any given instance, the nut position, axially of the stem, may be predetermined in accordance with the work thickness. In a similar manner a nut and stem of given dimensions may be adapted for fastening work of different thicknesses, by adjusting in accordance with the work thickness, the position of the nut element. To illustrate, in applying the nut and stem assembly of Figs. 1 to 3 to thinner sections of work, see Fig. 5, spacers 35 may be placed between the nut 19 and the work to maintain the former in proper position to assure turning the tongue 25 to the desired position of angularity between the springs 27 when the head 16 is seated against the work.

I claim:

1. A fastener comprising a screw threaded stem adapted to be inserted from one side of the work through an opening therein, a fixed nut at the opposite side of the work and receiving the stem thread when the stem is in an initially tightened position so that the stem then may advance axially upon rotation to a farther tightened position, eccentric means carried by the stem, and a stem-tightening spring supported independently of the stem at said opposite side of the work and having a portion in engagement with said eccentric means.

2. A fastener comprising a screw threaded stem adapted to be inserted from one side of the work through an opening therein, a fixed nut at the opposite side of the work and receiving the stem thread when the fastener is in tightened condition, eccentric means on the end portion of the stem inserted through the nut, and a stem-tightening spring supported independently of the stem at said opposite side of the work and having a portion in engagement with said eccentric means.

3. A fastener comprising a screw threaded stem adapted to be inserted from one side of the work through an opening therein, a fixed nut at the opposite side of the work and receiving the stem thread when the stem is in an initially tightened position so that the stem then may advance axially upon rotation to a further tightened position, eccentric means on the end portion of the stem beyond its threads, and a pair of springs supported independently of the stem at said opposite side of the work and engaging said eccentric means to exert a rotative and tightening thrust against the stem.

4. A fastener comprising a screw threaded stem adapted to be inserted from the outside of the work through an opening therein, a head on said stem engageable against the outside of the work, a fixed nut at the inside of the work and receiving the stem thread when the stem is in an initially tightened position so that the stem then may advance axially upon rotation to a further tightened position, eccentric means carried by the stem, and a spring supported at said inside of the work and having a portion in engagement with said eccentric means to exert a rotative and tightening thrust against the stem when said head is engaged against the work.

5. A fastener comprising a stem adapted to be inserted from one side of the work through an opening therein, said stem having a screw thread and beyond said thread a flattened tongue, a fixed nut at the opposite side of the work and receiving the stem thread when the fastener is in tightened condition, and a spring supported independently of the stem at said opposite side of the work and exerting against said flattened tongue a rotative force acting to advance the stem in the nut.

6. A fastener comprising a stem adapted to be inserted through an opening in the work and having a head engageable with one side of the work, said stem having a screw thread and beyond said thread away from the head a tongue flattened on opposite sides, a fixed nut at the side of the work opposite the head engaged side thereof and receiving the stem thread when the fastener is in tightened condition, and springs carried by said nut and engageable with said flattened sides of the tongue, said springs exerting against the tongue a rotative force acting to advance the stem in the nut.

7. A fastener for sectional work, comprising a stem having a head engageable with one side of the work and carrying a screw thread adapted to be inserted through an opening in the work, a fixed nut element at the side of the work opposite said head and into which the stem thread is turned, a flattened tongue forming the end of the stem beyond its thread and projecting beyond the nut, oppositely disposed springs supported independently of the stem at said opposite side of the work and engaged by said tongue to resist and then aid turning of the stem as the stem is turned through successive angles of rotation into the nut element, the work thickness and said nut element being so related that said springs are caused to resist rotation of the stem out of the nut element when said head is brought into engagement with the work.

EMMET M. GREEN.